March 1, 1966
J. L. ROILAND
3,237,752
FLATWORK CONVEYER
Filed May 7, 1964
2 Sheets-Sheet 2
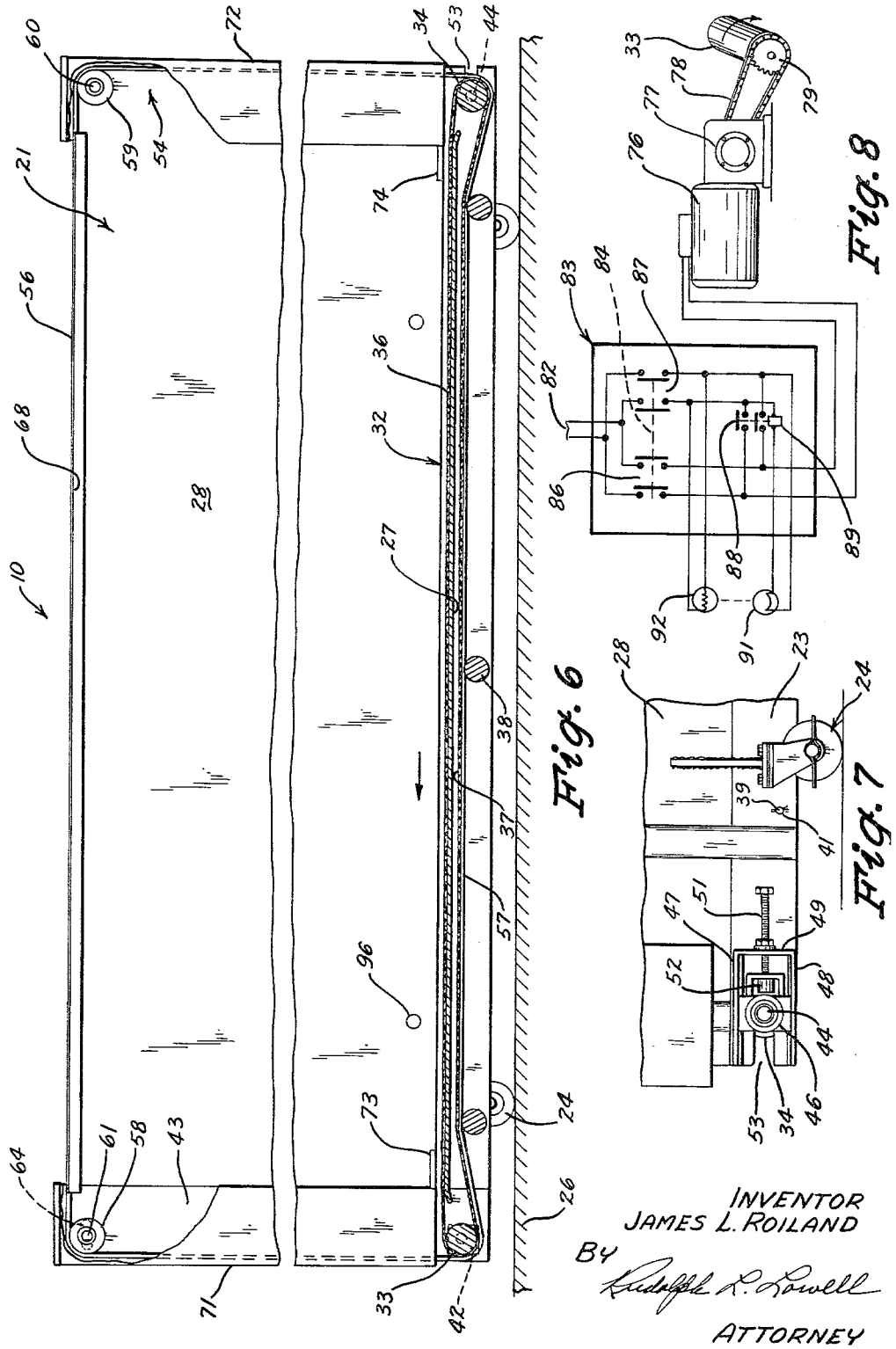
INVENTOR
JAMES L. ROILAND
BY
Rudolph L. Lowell
ATTORNEY

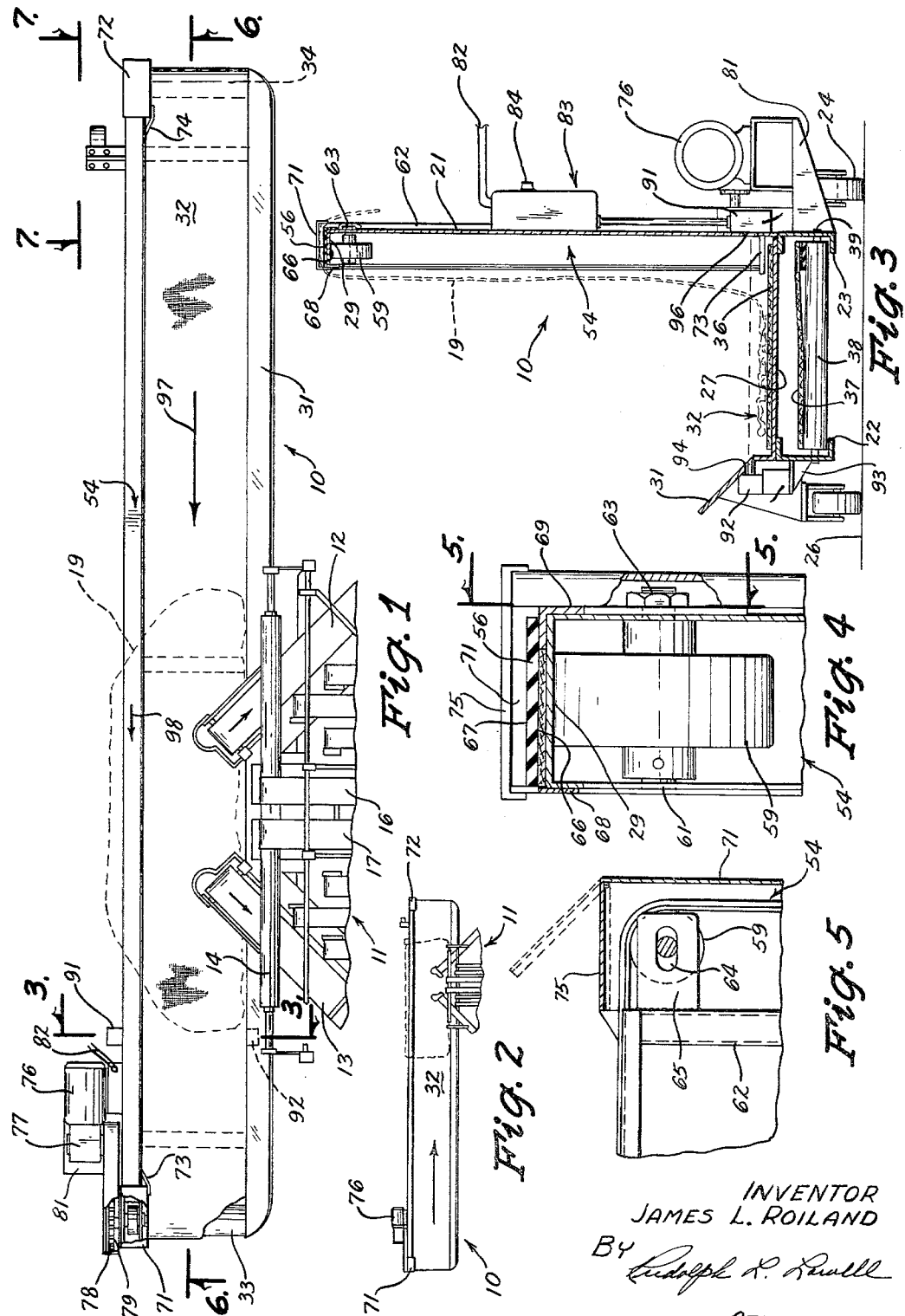

United States Patent Office 3,237,752
Patented Mar. 1, 1966

3,237,752
FLATWORK CONVEYER
James L. Roiland, 1201 Walnut, Des Moines, Iowa
Filed May 7, 1964, Ser. No. 365,702
5 Claims. (Cl. 198—75)

This invention relates to a material handling apparatus and more particularly to a machine for conveying flatwork.

It is the object of this invention to provide an improved machine for unfolding and transporting flatwork, such as sheets.

Another object of the invention is to provide a machine which is operable to expand one side of a sheet and hold this side in an elevated position with respect to the remainder of the sheet.

A further object of the invention is to provide a machine having conveyer means for moving an expanded sheet to a selected position and holding the sheet at the selected position.

Still another object of the invention is to provide a machine having moving conveyer means for carrying an expanded sheet which is automatically stopped when the sheet reaches a selected position.

An additional object of the invention is to provide a portable and rugged machine for conveying flatwork which is economical and sturdy in construction and reliable and effective in use.

These and other objects and advantages of this invention will become apparent upon reference to the following description and the accompanying drawing, wherein:

FIG. 1 is a plan view of the conveying machine of the invention positioned in an operating relationship with a machine for spreading flatwork;

FIG. 2 is a reduced view illustrated similar to FIG. 1 showing the alternate position of the conveying machine with respect to the flatwork spreader;

FIG. 3 is an enlarged sectional view taken along the line 3—3 of FIG. 1;

FIG. 4 is an enlarged showing of the top section of FIG. 3;

FIG. 5 is a reduced sectional view taken along the line 5—5 of FIG. 4;

FIG. 6 is a sectional view taken along the line 6—6 of FIG. 1;

FIG. 7 is a fragmentary elevational view showing the caster and adjustable bearing of the conveying machine of FIG. 1; and FIG. 8 is a diagrammatic showing of the electrical controls for the drive mechanism of the conveying machine of FIG. 1.

Referring to the drawing, there is shown in FIG. 1, the conveying machine of this invention indicated generally at 10 positioned adjacent the front end and extended from the right side of a flatwork spreader 11 shown in fragmentary form. The flatwork spreader 11 is described in U.S. Patent No. 2,585,834 issued February 12, 1952, and has a pair of diverging endless conveyer belts 12 and 13 engageable with a tranverse floating pressure roller 14. Guide belts 16 and 17 are trained over the center section of the transverse roller 14. In use flatwork, such as sheets, are fed into the spreader 11 between the upper runs of the diverging conveyer belts 12 and 13 and the floating pressure roller 14. The moving belts carry the sheet longitudinally through the spreader while simultaneously applying opposite lateral forces thereto.

One of the problems which is present in the use of a flatwork spreader is the preparation of the sheet for insertion between the diverging belts 12 and 13 and the pressure roller 14. One side of the sheet must be unfolded or extended for the initial insertion into the spreader. This operation is accomplished by the conveying machine of the present invention. The sheets are initially in a container or tub (not shown) positioned adjacent the feeding end of the conveying machine 10. Each sheet in succession is removed from the container and placed on the conveying machine 10 for transportation to a feed position adjacent the front or input end of the spreader 11, as shown in broken lines by the sheet 19. One side of the sheet 19 is held at an elevated position during the transportation of the sheet by the conveying machine 10 to the feed position.

As shown in FIG. 3, the conveying machine 10 comprises a sheet metal L-shaped frame 21 the shorter horizontal leg 27 of which is secured to the top of a pair of horizontal channel beams 22 and 23. Caster wheel assemblies 24 secured to the opposite ends of the channel beams 22 and 23 support the machine 10 on a surface 26, such as a floor. Integrally joined with one side of the horizontal leg or base wall 27 is a vertical leg or wall 28 which terminates in a horizontal flange 29 positioned above and extended substantially parallel to the base wall 27. The opposite side of the base wall 27 is joined with an upwardly and outwardly projected flange 31.

A first endless belt 32 (FIG. 6) is positioned about the base wall 27 with the opposite ends of the belt trained around a driver roller 33 and an idler roller 34. The top run 36 of the belt 32 engages the top surface of the base wall 27. The bottom run 37 of the belt 32 is held out of engagement with the floor surface 26 by a plurality of transverse support rollers 38 extended between and carried on the beams 22 and 23. As shown in FIG. 3 each roller 38 has outwardly projected stub axles 39 at the opposite ends thereof that are received in holes 41 in the upright sections of the beams 22 and 23 (one shown in FIG. 7) to rotatably support the rollers 38 on the beams 22 and 23.

The opposite ends of the drive roller 33 are rotatably mounted in conventional bearings 42, one of which is shown in FIG. 6, attached to adjacent ends of the channel beams 22 and 23. The idler roller 34 is longitudinally adjustable to vary the tension on the belt 32. The idler roller 34 has stub shafts 44 projected from the opposite ends thereof. Each stub shaft 44 is mounted in a bearing 46, one of which is shown in FIG. 7. The following description is limited to one bearing 46 and its support structure.

The bearing 46 (FIG. 7) is positioned between a pair of horizontal plate members 47 and 48 secured to the side of the beam 23. An upright cross plate 49 is secured to the inside ends of the plate members 47 and 48. A bolt 51 is threaded through the central section of the cross plate 49 and attached to a thrust block 52 carried by the bearing 46. The shaft 44 projects through a horizontal slot 53 in the beam 23 so as to permit movement of the bearing with respect to the plate members 47 and 48 resulting from rotation of the bolt 51. The stub shaft on the opposite end of the idler roller 34 is mounted in a similar bearing which is carried in an identical adjustable bearing support structure.

As shown in FIGS. 3 and 6, a second endless belt 54 is positioned in an upright plane adjacent the upright wall 28 and comprises an upper run 56 engageable with the top surface of the horizontal flange 29 and a bottom run 57 engageable with the bottom run 37 of the first conveyer belt 32. As a result of this engagement the belt 54 is driven from the belt 32 so that both belts move at the same rate of speed. The belt 54 (FIG. 6) is trained over pulleys 58 and 59 rotatably mounted on the frame 21 adjacent the opposite ends of the horizontal flange 29.

The pulley 58 is mounted on a stub axle 60 secured to and extended horizontally from the top section of the upright angle member 43 attached to the beam 23. As shown in FIGS. 4 and 5, the pulley 59 is rotatably mounted on an axle 61 connected by a nut and bolt assembly 63 to a plate 65 secured to the top section of an upright channel member 62. The nut and bolt assembly 63 extends through a horizontal slot 64 in the plate 65 and is adjustable to change the position of the pulley 59 to vary the tension on the belt 54.

As shown in FIG. 4, the belt 54 is of a laminated construction including an inner canvas web 66 secured to an outer rubber web 67. The web 66 is of a lesser width than the web 67 and is positioned between an upright rib 68 secured to the outer edge of the horizontal flange 29 and a channel member 69 secured to the top of the upright wall 28 and the inner edge of the flange 29. The outer web 67 rides on the top of the rib 61 and the top of the angle member 69. The rib 68 and angle member 69 form with the top surface of the horizontal flange 29 a groove or guideway for accommodating the inner canvas web 66 to maintain the top run of the belt 54 in engagement and alignment with the horizontal flange 29 during the movement of the belt 54 from pulley 58 to pulley 59.

The pulleys 58 and 59 and the upright portions of the belt 54 are enclosed in sheet metal guards 71 and 72 which prevent the flatwork or sheet 19 from wrapping around the pulleys 58 and 59. The sheet metal guards 71 and 72 (FIGS. 1 and 6) carry fingers 73 and 74, respectively, which are positioned adjacent the upper run of the belt 32. Fingers 73 and 74 project toward the wall 28 and function as guide members for preventing the sheet from moving into the sheet metal guards 71 and 72. As shown in FIG. 5, the metal guard 71 has a hinged cover 75 providing an access opening for adjusting the position of the pulley 59 to vary the tension in the belt 54.

The roller 33 (FIGS. 1 and 8) is driven by an electric motor 76 which is drivably connected to a speed reduction power transmission 77. A chain 78 trained around sprocket 79 transmits power from the speed reduction unit 77 to the roller 33. As shown in FIG. 3, the motor 76 is secured to the top of a table 81 projected laterally from the channel beam 23.

The motor 76 may be alternately manually or automatically connected and disconnected with a source of electric power 82 by a switch mechanism 83 mounted on the upright wall 28. The switch mechanism 83 has a control knob 84 movable to a manual "on" position, and "off" position and an "automatic on" position.

As shown in FIG. 8, the switch mechanism 83 has a first switch 86 coupled to the control knob 84 and operable to connect and disconnect the electric motor 76 with the source of electric power 82. The switch 86 is moved to open and closed positions with the movement of the control knob 84 to the manual "on" position and "off" position. The electric motor 76 will continue to run as long as the switch 86 is in the "on" position.

When the control knob 84 has been moved to the "automatic on" position, a second switch 87 is closed and connected in series with a normally open third switch 88. When the third switch 88 is closed the electric motor 76 is connected to the source of electric power 82. The switch 88 is controlled by a solenoid 89 which is coupled to a light sensing unit 91 of an electric eye. The light sensing unit 91 is aligned with a light transmitting unit 92 and is sensitive to light to complete the circuit to the solenoid 89 so that the switch 88 remains closed as long as the light sensing unit 91 is activated.

As shown in FIG. 3, light transmitting unit 92 is mounted on a bracket 93 secured to the side of the beam 22 below the flange 31. Light from the unit 92 is directed through a hole 94 in the flange 31 to a hole 96 in the upright wall 28, it being understood that the holes 94 and 96 are in alignment.

When a sheet carried by the belts 32 and 54 is positioned between the holes 94 and 96 the beam of light from the transmitting unit 92 will be blocked from the light sensing unit 91 thereby closing the circuit to the solenoid 89 which in turn will close the switch 88 thereby connecting the electric motor 76 with the source of electric energy 82.

In the operation of the conveying machine 10 the belts 32 and 54 are in an inter-engaged driving relation to move at substantially the same linear rate of speed in the direction of the arrows 97 and 98 (FIG. 1). This movement is continuous as long as the electric motor 76 is operating. With the belts 32 and 54 in operation a piece of flatwork is manually positioned by a first attendant with one edge unfolded and draped over the belt 54. From such one edge the sheet or flatwork extends downwardly along the wall 28 with its remaining portion carried on the belt 32. When the flatwork 19 reaches the feed position shown in broken lines in FIG. 1 a second attendant picks up the draped over edge and inserts it into the flatwork spreader 11 which removes the entire flatwork from the conveying machine 10.

With the control knob 84 in the manual "on" position the belts 32 and 54 continue to move regardless of the position of the flatwork relative to the spreader 11. Each sheet must be removed and inserted into the spreader 11 as the sheet approaches the feed position.

When the control knob 84 has been moved to the "automatic on" position the sheet 19 will stop at the feed position because the forward section thereof moves between the light sensing unit 91 and the light transmitting unit 92 of the electric eye with the result that the electric motor 76 is turned off thereby stopping the movement of the belts 32 and 54. As soon as the sheet 19 has been removed by the spreader 11 from between the light sensing unit 91 and the light transmitting unit 92 the switch mechanism 83 will be actuated to connect the motor 76 with the source of electric power 82 thereby driving the belts 32 and 54 in the direction of the arrows 97 and 98.

As shown in FIG. 2, the conveying machine 10 may be positioned for operation from the left side of the spreader 11. With the machine 10 in this position the electric eye control is mounted on the opposite end of the frame 21 and the motor 76 is operated in reverse thereby reversing the direction of movement of the belts 32 and 54.

In summary, the conveying machine 10 is operative to transport flatwork, such as sheets, to a position adjacent the input end of a flatwork spreader. The machine 10 has a pair of endless belts 32 and 54 positioned in a driving relation with each other so as to move at substantially the same rate of speed. The belt 54 is positioned in an upright plane and has a top run extended horizontally above the top run of the belt 32. In use the center portion of one side of the sheet is initially draped over the top run of the belt 54 and the remainder of the sheet placed on the belt 32. As the belts 32 and 54 move the draped over edge of the sheet is moved to the feed position adjacent the input section of the flatwork spreader 11.

The belts 32 and 54 are driven by an electric motor 76 which is selectively operable by a switch mechanism 83 to manually stop the movement of the belts 32 and 54 or automatically stop the movement of the belts 32 and 54 in response to a selected position of the sheet with respect to the frame of the machine 10. This is accomplished by an electric eye control which is operable to terminate the supply of power to the motor 76 when the sheet interrupts the beam of light between the light sensing unit 91 and the light transmitting unit 92.

While there have been shown, described, and pointed out the fundamental novel features of the invention, it will be understood that various omissions, substitutions, changes in form and details of the conveying machine illustrated may be made by those skilled in the art, without departing from the spirit of invention which is intended to be limited only as indicated by the scope of the following claims.

I claim:
1. A machine for moving a sheet comprising:
   (a) a frame having a first member and a second member positioned above and extended substantially parallel to the first member,
   (b) first endless conveyer means positioned about said first frame member and having a top run supported on said first member,
   (c) a drive member and an idler member engageable with the opposite ends of the first conveyer means,
   (d) means rotatably supporting the drive member and idler member on the frame,
   (e) second endless conveyer means positioned on the second frame member and extended about the first conveyer means in driven engagement therewith, said second conveyer means having a top run supported on said second frame member coextensive with the top run of said first conveyer means, and
   (f) means for rotating the drive member thereby simultaneously moving the first conveyer means along the first frame member and the second conveyer means along the second frame member at substantially the same rate of speed whereby the sheet is simultaneously carried and supported over the top runs of said first and second conveyer means.

2. A machine for moving a sheet comprising:
   (a) a pair of horizontal parallel and spaced beams,
   (b) an L-shaped frame means including a base wall secured to the top of said beams and an upright side wall having a flange extended substantially parallel to the base wall,
   (c) a first endless belt positioned about said base wall, said belt having a top run engaging the top of the base wall and a bottom run positioned between the beams,
   (d) a drive roller and an idler roller positioned between the top and bottom runs and engaged with the opposite ends of the first belt,
   (e) means rotatably supporting the opposite ends of the drive roller and idler roller on the beams,
   (f) a second endless belt having a top run supported on the flange and a bottom run engaged with the bottom run of the first belt, and
   (g) means for rotating the drive roller thereby simultaneously moving the first belt along the base whereby to move the second belt along the flange at substantially the same rate of speed.

3. A machine for moving a sheet comprising:
   (a) a pair of horizontal parallel and spaced beams,
   (b) an L-shaped frame means including a base wall secured to the top of said beams and an upright side wall having a flange extended substantially parallel to the base wall,
   (c) a first endless belt positioned about said base wall, said belt having a top run engaging the top of the base wall and a bottom run positioned between the beams,
   (d) a second endless belt having a top run supported on the flange and a bottom run engaged with the bottom run of the first belt, and
   (e) means for moving the first belt along the base whereby to move the second belt along the flange at substantially the same rate of speed.

4. A machine for moving a sheet to a selected position comprising:
   (a) an L-shaped frame means including a horizontal base wall and an upright side wall having a flange positioned above and extended substantially parallel to the base wall,
   (b) a first endless belt positioned about said base wall, said belt having a top run and a bottom run,
   (c) a drive roller and an idler roller engaged with the opposite ends of the first belt and rotatably supported on the frame means,
   (d) a second endless belt having a top run supported on the flange and a bottom run engaged with the bottom run of the first belt, and
   (e) means for rotating the drive roller thereby simultaneously moving the first belt along the base wall and the second belt along the flange.

5. A machine for moving a sheet comprising:
   (a) an L-shaped frame means including a horizontal base wall and an upright side wall having a flange positioned above and extended substantially parallel to the base wall,
   (b) a first endless belt positioned about said base wall, said belt having a top run and a bottom run,
   (c) a drive roller and an idler roller engaged with the opposite ends of the first belt and rotatably supported on the frame means,
   (d) a second endless belt having a top run supported on the flange and a bottom run engaged with the bottom run of the first belt, and
   (e) means including an electric motor operable to rotate the drive roller thereby simultaneously moving the first belt along the base wall and the second belt along the flange at substantially the same rate of speed.

References Cited by the Examiner

UNITED STATES PATENTS

| | | | |
|---|---|---|---|
| 986,753 | 3/1911 | Plummer | 198—184 |
| 2,837,198 | 6/1958 | Griffen | 198—21 |

SAMUEL F. COLEMAN, *Primary Examiner.*